United States Patent [19]

Wesman

[11] Patent Number: 4,667,475
[45] Date of Patent: May 26, 1987

[54] FLUID POWER APPARATUS FOR INDUSTRIAL ROBOTS AND THE LIKE

[76] Inventor: Verne A. Wesman, 34277 Hathaway, Livonia, Mich. 48150

[21] Appl. No.: 848,237

[22] Filed: Apr. 4, 1986

Related U.S. Application Data

[63] Continuation-in-part of Ser. No. 529,249, Sep. 16, 1983, abandoned.

[51] Int. Cl.$^4$ ............................................. F15B 7/02
[52] U.S. Cl. ..................................... 60/537; 60/593; 91/189 R; 92/85 R; 92/151; 901/17; 901/22; 901/37
[58] Field of Search ................. 60/537, 375, 413, 593; 91/517–519, 191, 405, 189 R; 92/110; 901/17, 22, 37; 414/749

[56] References Cited

U.S. PATENT DOCUMENTS

| | | | |
|---|---|---|---|
| 3,100,965 | 8/1963 | Blackburn | 91/4 R X |
| 3,253,519 | 5/1966 | De Roo | 92/110 |
| 3,951,271 | 4/1976 | Mette | 901/17 X |
| 4,181,066 | 1/1980 | Kitchen et al. | 91/405 X |
| 4,349,305 | 9/1982 | Wynn et al. | 91/517 X |
| 4,381,169 | 4/1983 | Muhr et al. | 901/37 X |
| 4,430,923 | 2/1984 | Inaba et al. | 91/398 X |
| 4,442,387 | 4/1984 | Lindbom | 901/22 X |
| 4,481,768 | 11/1984 | Goshorn et al. | 60/418 X |
| 4,564,331 | 1/1986 | Karr-Ake | 901/22 X |

Primary Examiner—Joseph J. Rolla
Assistant Examiner—Nils Pedersen
Attorney, Agent, or Firm—Reising, Ethington, Barnard, Perry & Milton

[57] ABSTRACT

A fluid power apparatus particularly useful for an industrial robot which includes a pair of expansible chamber devices each having a pair of control chambers in fluid communication with each other to intensify the working fluid output pressure and a working chamber that expands to receive a charge of working fluid and contracts to expel working fluid therefrom. A working fluid circuit includes a first line connected with one of the working chambers and a second line connected with the other of the working chambers. A fluid actuator is connected with the circuit and has a moveable element that moves in response to flow of working fluid in the circuit to the actuator. The apparatus has a static condition in which the one working chamber is contracted with the moveable element of the actuator stationary in a first position. A control mechanism is operable in response to a demand to change the position of the moveable element from the first position to a second position to sequentially alternately contract and expand the working chambers, respectively, to cause flow of working fluid to the actuator and move the element to the second position and thereafter restore the static condition.

11 Claims, 8 Drawing Figures

FLUID POWER APPARATUS FOR INDUSTRIAL ROBOTS AND THE LIKE

This application is a continuation-in-part of application Ser. No. 529,249 filed Sept. 16, 1983, now abandoned.

TECHNICAL FIELD

This invention relates generally to fluid power apparatus for industrial robots and similar devices, and is particularly concerned with such apparatus in which the pressure from a relatively compressible control fluid, such as air, is utilized to cause a relatively incompressible hydraulic working fluid to operate a fluid actuator and cause a robot arm to be manipulated to perform an industrial operation.

The utilization of this general type of apparatus involves ecological, safety and economic considerations, each of which is addressed by the present invention.

In one general type of prior art apparatus, the hydraulic working fluid pressure is maintained by a continuously operating pump which operates to circulate the hydraulic working fluid from a tank or reservoir at atmospheric pressure through the circuit at a predetermined pressure. The variations in the demand on the pump causes variations in the temperature of the working fluid. Variations in temperature, in general, cause variations in the viscosity of a fluid, which, in turn, causes a variation in the response of the actuators and other devices powered by the hydraulic working fluid.

As the petroleum content of the fluid increases, the likelihood of the contamination from spillage during handling of the fluid, or from rupture and leakage from the apparatus in which the fluid is used, increases. Conversely if the water content of the fluid is increased with respect to the petroleum content, there is less likelihood of contamination since the petroleum content is reduced. Further, it is easier to maintain a constant viscosity with varying temperatures as the water content increases in proportion to the petroleum content of the fluid. Further, in such systems, the pump constantly consumes power which is undesirable from both an ecological and economic standpoint.

In typical prior art apparatus of this type, there is a relatively high pressure at all times of the hydraulic working fluid — a pressure on the order of 1,000 p.s.i. This presents a safety hazard in the event of rupture or failure in the system because of the high energy that is quickly dissipated.

In the operation of fluid powered actuators, it is desirable to prevent the moveable element of the actuator from overshooting, or in the case where the moveable element engages a stop, from striking the stop with a high impact. The speed of the movement of the moveable element of the actuator is also a factor in the efficiency of the operation. It is therefore desirable for the moveable element to move at a high speed until it approaches its final position, at which time the speed slows until it reaches the desired position.

The prior art device of Blackburn U.S. Pat. No. 3,106,965 discloses a gas/fluid hydraulic power supply wherein gas pressure energy is transferred to a hydraulic fluid through a moveable wall in an expansible chamber device. This moveable wall separates the control chamber, having a gaseous control fluid, from the working chamber having hydraulic working fluid.

The Blackburn system discloses a pair of expansible chamber devices having a pair of working chambers in fluid communication with each other such that when hydraulic fluid is displaced by one of the working chambers to operate an actuator, the fluid is recovered by the working chamber of the second expansible chamber device, thus charging the working chamber of the second expansible chamber device. When the operating working chamber completes its cycle by expending the available hydraulic working fluid, a sensing switch switches rotary valves to provide gas pressure to the control chamber of the second expansible chamber device and hydraulic fluid from the second working chamber is routed to the actuator. Thus, the cycling continues until the actuator is moved to the desired position.

The Blackburn U.S. Pat. No. 3,106,965 device has no means for intensification of the pressure on the hydraulic fluid in the working chamber Thus, the pressure provided by the gas on the control chamber is the same as that provided in the hydraulic fluid circuit. If a series of actuations were needed the space required to house the Blackburn unit would be large, thus making it undesirable in robot applications.

In addition, the Blackburn U.S. Pat. No. 3,106,965 device has a loss of fluid circuit pressure to the actuator while switching from one expansible chamber device to the other providing excess hesitation in the Blackburn device. The hesitation is undesirable in the robot art where smooth and precise actuator movements are desirable features Further, the Blackburn device fails to provide for a leveling of the hydraulic fluid in the working system after the actuator movement is completed. Upon continued cycling, the Blackburn system would result in an imbalance in the working chamber due to fluid flowing into the control chambers and would eventually cause the system to become inoperable.

Prior art pressure gas/hydraulic intensifier units are known in the art in which low pressure fluid (air) acts on a piston of large area which drives a piston of small area to pump the hydraulic fluid such as that disclosed in Beck U.S. Pat. No. 3,407,601. Also disclosed are intensification units using more than one piston area to control the amount of pressure on the smaller cylinder by controlling the operation of the number of control chambers to be pressurized as is disclosed in the Bits U.S. Pat. No. 4,170,876.

However, the prior art intensification devices required a complicated control system including separating valves for individual air cylinder charging of the control chambers and the working chambers of these prior art devices must be continually recharged with working fluid before the system can be further used. The prior art systems also necessitate the use of a smaller working chamber, and therefore the prior art units displace a small volume of fluid per stroke and could not accommodate the actuators used in robots requiring a large amount of fluid displacement.

The present invention is a novel improvement on the prior art since it provides a solution to the problems listed above in the following way.

The present invention provides a simplified constant pressure intensification device in which two pressurized control chambers are in fluid communication with each other and pressurized by the same manifold source. The working chamber, operated on by the control chamber, is of the same diameter as the pistons of the control chamber and therefore more useable working fluid is provided and at a higher constant pressure than the prior art devices.

In a second configuration of the present invention pressure intensification is provided by way of a differential surface area, where the operable surface area of the single piston-head, in the control chamber is greater than the operable surface area exposed in the working chamber. This may be accomplished by the use of a piston rod which is passed through the working chamber. This provides a single means for allowing intensification in the working chamber while providing for a greater working fluid capacity.

The present invention provides constant pressure to the actuator even during the switching from one expansible chamber device to another. This is accomplished by providing for the charging of the pressure line from the working cylinder of one expansible chamber device before exhausting the pressure in the control chamber of the other expansible chamber device at the end of its power cycle as further set forth below.

In addition, the present invention provides for a leveling of the chamber at the completion of actuator movement such that the working chamber of the first expansible chamber device is fully charged and the working chamber of the second expansible chamber device is at the fully compressed ready for charging level, as further set forth below.

Prior art United States Patents disclosing apparatus relating to one or more of the problems set forth above include U.S. Pat. Nos. 2,765,624; 3,001,369; 3,407,601; 3,529,422; 3,855,794; 4,002,030; 4,006,664; 4,043,533; 4,144,904; 4,151,785; 4,178,076 and 4,358,989.

DISCLOSURE OF THE INVENTION

Fluid power apparatus according to the present invention comprises a pair of expansible chamber devices each having a working chamber, and a control chamber or pair of control chambers. The working chamber expands to receive a charge of working fluid and contracts to expel working fluid therefrom. The apparatus also includes a working fluid circuit including a first line connected with one of the working chambers and a second line connected with the other of the working chambers of the expansible chamber devices. A fluid actuator is connected with the circuit and has a moveable element that moves in response to flow of working fluid in the circuit to the actuator.

The fluid power apparatus according to the present invention has a static condition in which one of the working chambers is expanded and the other working chamber is contracted with the moveable element of the actuator maintained stationary in a desired position The fluid power apparatus of the present invention includes a control means which is operable in response to a demand to change the position of the moveable element of the actuator to sequentially and alternately contract and expand the two working chambers of the expansible chamber devices which, in turn, causes flow of working fluid to the actuator and moves the moveable element to a second desired position. The control means thereafter restores the apparatus to the static condition.

In a first configuration of the apparatus, expansible chamber devices each have a pair of expandible and contractible control chambers separated from the working chamber by a moveable wall such that expansion and contraction of the control chambers cause corresponding contraction and expansion, respectively, of the associated working chamber.

In a second configuration of the apparatus, the expansible chamber devices have a single control chamber and a single piston-head and a piston rod. The piston rod passes through the working chamber and provides a differential operable surface area, which has a greater operable surface area in the control chamber than in the working chamber and provides intensified working fluid pressure.

The control means includes a source of control fluid under pressure. The control means is operable to control communication between the control pressure source and the control chamber, or a pair of chambers, of the expansible chamber devices.

The control means further includes control fluid valve means for controlling supply and exhaust of control fluid from the control chambers.

In the static condition of the apparatus, one of the control chambers or pairs of control chambers is pressurized by the control fluid, and the other pair of control chambers is connected with exhaust.

In the first configuration of the invention, each expansible chamber device has a double-headed piston assembly inside of a cylinder. The double-headed piston assembly has an upper piston head, a connecting rod and a lower piston head. The connecting rod rigidly connects the upper piston head with the lower piston head and allows simultaneous movement between the upper piston head and the lower piston head inside the cylinder. A stationary wall is provided and placed between the upper piston head and the lower piston head with the connecting rod passing through the stationary wall and sealed in sliding engagement with the stationary walls. The connecting rod has upper and lower end portions, the upper end portion is connected to the upper piston by threads or other method of attachment and extends through the upper piston. The lower end portion of the connecting rod extends into the lower piston. The connecting rod has a hollow portion passing through it and has connecting ports at the lower end. The connecting ports lead into control fluid ports in the lower piston and provides fluid communication between the pair of control chambers.

The pair of control chambers of each of the expansible chamber devices in the first configuration of the apparatus are in fluid communication with each other and with the common air pressure manifold through a control valve. Each control chamber is pressurized at the pressure of the air pressure manifold. The control chamber closest to the air pressure manifold input is charged directly. The second control chamber is pressurized through a passageway running through a hollow portion in the connecting rod which has outlets into the second control chamber located on the inside of the second piston.

The first control chamber is defined as being the space between the top of the cylinder and the top of the upper piston-head. The second control chamber is defined as being between the bottom of a stationary wall and the top of the lower piston-head. The stationary wall is in sealing engagement with the sides of the cylinder and also surrounds and provides a slideable seal around the connecting rod. The connecting rod operatively connects the upper and lower pistons and is slideably mounted through the stationary wall and transfers the force of the first chamber to the lower piston of the lower chamber.

In operation, the pressure in the upper chamber and the pressure in the lower chamber have an addition effect such that pressure exerted on the working chamber is approximately twice that in either control chamber. Thus, an intensified working fluid pressure is obtained by the configuration of this invention.

The circuit for the working fluid includes a main pressure line and a main return line. Check valves permit one-way flow from the first and second lines into the main pressure line and from the return line into the first and second lines, but prevent flow in the opposite direction.

The fluid powered actuator is connected with advance and reverse lines such that flow of working fluid into the actuator from the advance line causes the moveable element of the actuator to move in one direction as well as flow of working fluid from the actuator through the reverse line The control means includes a working fluid valve having a first position in which the advance line is connected with the pressure line of the working fluid circuit, and the reverse line is connected with the return line, and a second position in which the advance line is connected with the return line and the reverse line is connected with the pressure line.

When there is a demand to cause the moveable element of the actuator to change positions, the working fluid valve of the control means changes positions to reverse the connection between the forward and reverse lines of the actuator and the pressure and return lines of the actuator and the pressure and return lines of the working fluid circuit. As a result of the change in pressure permitting the moveable element of the actuator to change positions, the working chamber of the expansible chamber device connected with the control pressure contracts to expel a charge of non-gaseous working fluid into the circuit to the actuator causing fluid to flow into the actuator from the pressure line, and fluid to flow from the actuator into the return line which results in corresponding expansion of the working chamber or the other expansible chamber device. The control means sequentially operates to disconnect the first expansible chamber from the control pressure as its working chamber reaches its contracted position and to connect the other control chamber with the control pressure when its working chamber is in the expanded position. The two working chambers alternately expand and contract to cause flow of non-gaseous working fluid into the actuator until the moveable element of the actuator reaches its desired position, after which the apparatus returns to its static condition.

The control fluid is air, or some other relatively compressible gaseous fluid, while the working fluid is a relatively incompressible liquid such as non-gaseous fluid with a high water content.

Since the apparatus operates on demand only, there is no pumping action unless one of the actuators connected in the system moves. There is therefore no heat generated as is the case with conventional constant pumping systems. This permits a high water base fluid to be used as the non-gaseous fluid to maintain a constant viscosity. As an ecological consideration, the utilization of a high water base fluid reduces the likihood of contamination if the system ruptures or leaks.

There is no power consumption in the static condition of the apparatus of the present invention. The only energy expended is that necessary for maintaining the control pressure. The control pressure fluid is preferably air, and the pressure can be maintained by a compressor which run only intermittently.

Since the control fluid is preferably air, and the working fluid is a non-gaseous fluid, the apparatus of the invention provides the high speed of an air powered actuator with the fine control of a liquid powered actuator due to the ability to use a high water base fluid.

As a safety consideration, the pressure can be maintained relatively low in the fluid part of the circuit — approximately 100 to 200 p.s.i. as opposed to conventional circuits which require an operating pressure on the order of 1,000 p.s.i. or greater.

The working fluid control valves of the present invention, in the case where the actuator moveable element must move a significant distance from one position to another, is a proportional valve that is programmed to permit maximum fluid flow to the actuator when it initially starts its travel, but throttles the flow to a lower rate as the moveable element approaches its desired position. The moveable element of the actuator thus moves at a relatively high rate of speed until it approaches its final position, after which it moves at a slow rate of speed until it either strikes a stop or otherwise is caused to stop movement.

The objects, advantages and features of the invention will become apparent from the following description, taken in connection with the accompanying drawings.

This application includes the subject matter of disclosure number 111897 filed Oct. 15 1982, which is incorporated herein by reference in its entirety.

DESCRIPTION OF THE PREFERRED EMBODIMENT

Figures 1, 2, 2A, 3:
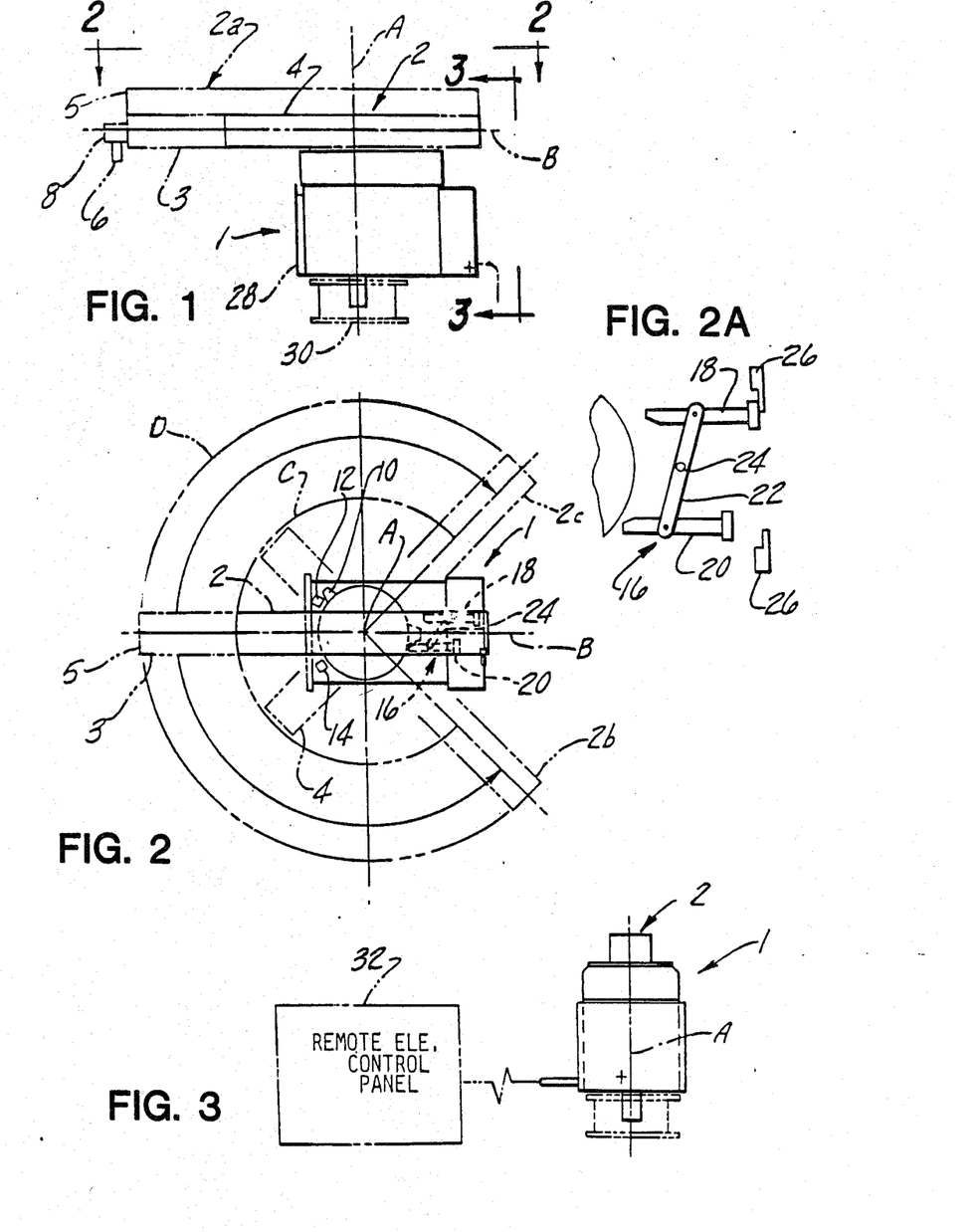
FIG. 1 is a front elevational view, in diagrammatic form, of an industrial robot.
FIG. 2 is a top plan view taken along lines 2—2 of FIG. 1.
FIG. 2A is an enlarged detail of an intermediate stop mechanism of FIG. 2.
FIG. 3 is an end view taken along lines 3—3 of FIG. 1.

FIGS. 1-3 illustrate an industrial robot having a base assembly indicated collectively by reference number 1. A robot arm assembly 2 is supported on the base assembly 1.

The arm assembly 2 is rotatable about an axis A as indicated by the various positions of the arm assembly 2 shown in full and phantom lines in FIG. 2. The arm assembly 2 is also shiftable along axis A between the full and phantom line position shown in FIG. 1. The phantom line position is indicated in FIG. 1 by reference numeral 2a.

The arm assembly 2 is made up of a pair of arms, members 3 and 4. The arm member 3 is telescopically mounted on the arm member 4 so that it can be moved between a fully retracted position shown in full lines FIG. 1, and an extended position shown in phantom lines in FIG. 1.

The arm member 3 has a mounting face 5 formed on its outer end for attachment of a gripper mechanism 6 indicated schematically in phantom lines in FIG. 1. The gripper mechanism 6 has jaws of conventional construction moveable between a closed position to grip a workpiece, and an open position to release the workpiece.

A wrist mechanism, schematically illustrated in FIG. 1 and indicated by reference numeral 8, may also be attached to the mounting face 5 for rotation about axis B — the longitudinal axis of the arm assembly 2.

In FIG. 2, reference characters C and D indicate the arcuate paths of the outer end of the mounting face 5 of the arm member 3 during rotation of arm assembly 2 when the arm member 3 is respectively in the fully retracted and fully extended positions. As illustrated in FIG. 2, the arm assembly 2 is rotatable about the axis A through 270 degrees between the extreme positions indicated at 2b and 2c in FIG. 2. An intermediate position, 135 degrees from each of the positions 2b and 2c, as shown in full lines in FIG. 2.

The extreme positions of the arm assembly 2 are determined by fixed stops or abutments 12 and 14 on the base assembly 1 that are engageable with a lug 10 projecting from the shaft of the arm assembly 2. In position 2b of the arm assembly, 2 lug 10 engages abutment 12. The arm assembly is rotatable through an arc of 270 degrees about an axis A until the lug 10 engages abutment 14 as the arm assembly 2 assumes position 2c.

An intermediate stop mechanism indicated collectively by reference numeral 16 is provided to selectively limit rotation of the arm assembly 2 between either positions 2b and 2c and the full line position shown in FIG. 2. The intermediate stop position illustrated in FIG. 2 is located midway between positions 2b and 2c so that the arm assembly 2 swings 135 degrees about axis A when the stop assembly 16 is active.

The stop mechanism 16 includes a pair of moveable stop members 18 and 20 each mounted for reciprocation between active and inactive positions in a direction parallel to axis B. The stop members 18 and 20 are connected together by a bell crank lever 22 having a shaft 24 connected to a rotary actuator (not shown in FIGS. 1-3). As shown in FIGS. 2 and 2A, the moveable stop member 20 is in an active position to engage the lug 10, while the moveable stop member 18 is in a retracted or inactive position seated against an abutment 26. In the inactive position, the lug 10 can rotate freely past the moveable stop member 18. Rotation of the bell crank lever in a counterclockwise direction about the axis of shaft 24 from the position shown in FIGS. 2 and 2A moves the moveable stop member 18 into an active position, while simultaneously retracting stop member 20 to an inactive position seated against abutment 26.

The base assembly 1 is also provided with a mounting plate 28 for mounting the robot on a horizontal support such that the axis A is disposed horizontally. A ceiling or floor mount 30 may also be provided when it is desired for the arm assembly 2 to rotate in a horizontal plane about a vertical axis A.

In FIG. 3, reference numeral 32 designates a remote electrical control panel for operation of the robot assembly.

According to the present invention, the robot arm assembly 2, as well as the intermediate stop mechanism, wrist mechanism, and gripper mechanism, are operated by linear and rotary fluid actuators, each of which has a moveable element that moves from one position to another in response to flow of non-gaseous working fluid to and from the actuator. The various linear and rotary fluid actuators are illustrated schematically in FIGS. 4A and 4B. Each of the actuators is connected in the working fluid circuit by a pair of fluid lines, one of which is referred to herein as the "advance" line, and the other of which is referred to as the "reverse" line. Each of the actuators has a moveable element that moves in opposite directions in response to flow of working fluid in opposite directions in its associated advance and reverse lines. In the case of a linear actuator, the moveable element extends and retracts linearly. In the case of a rotary actuator, the moveable element may be a shaft, vane or rotary piston that rotates in opposite directions about an axis. Conventional linear and rotary actuators may be employed, and the specific construction of the linear and rotary actuators form no part of the present invention.

The terms "advance" and "reverse" as applied to the working fluid lines connected directly with the actuators are arbitrary terms to distinguish between the opposite directions of movement of the moveable elements of the actuators. In the case of a linear actuator, the flow of working fluid into the actuator from the advance line results in extension of the moveable element of the actuator, while the flow of working fluid into the actuator from the reverse line results in retraction of the moveable element. In the case of a rotary actuator, the moveable element rotates in one direction in response to flow from the advance line into the actuator, and rotates in the opposite direction in response to flow into the actuator from the reverse line.

Figure 4A:
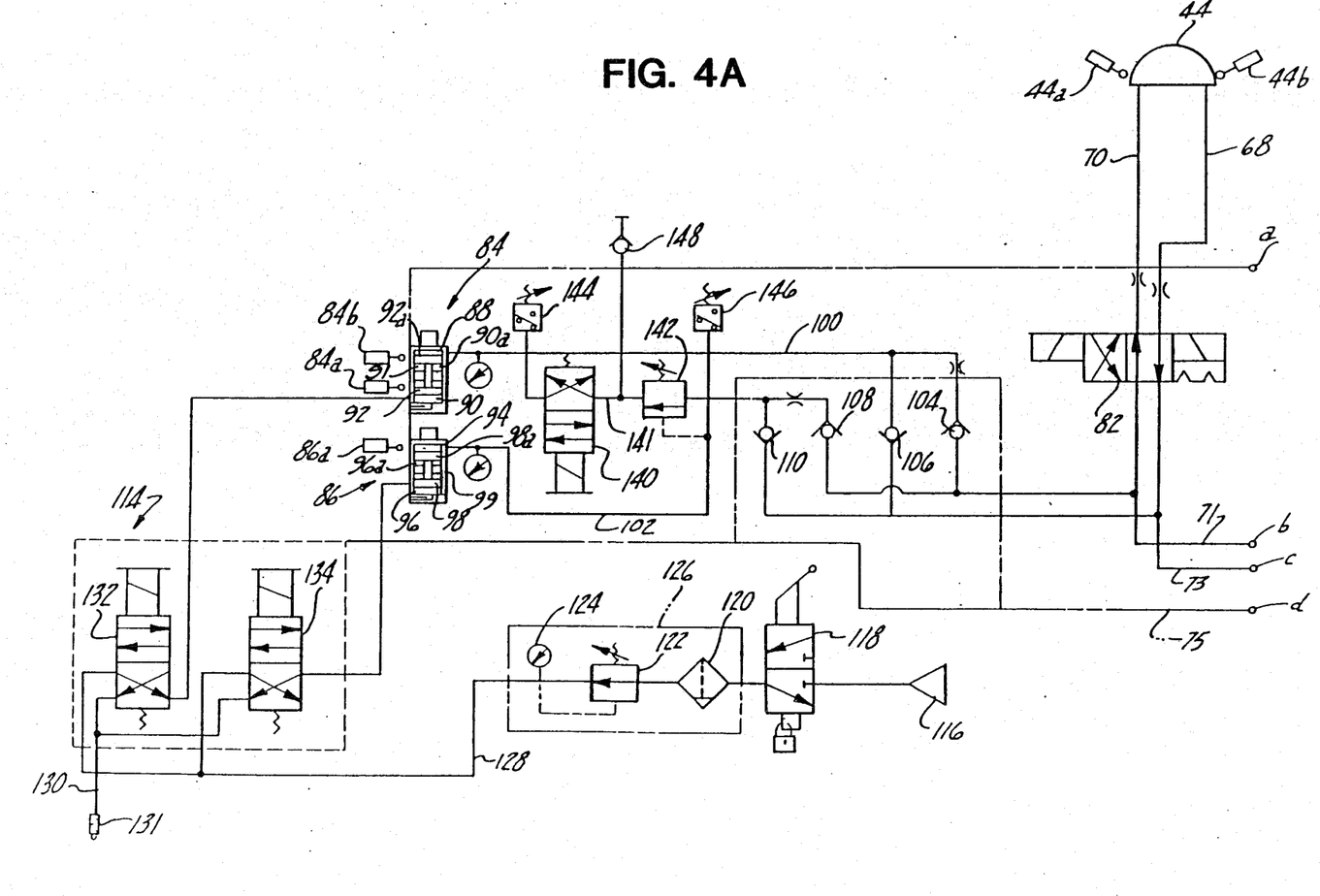
FIGS. 4A and 4B are each portions of a complete schematic diagram of the fluid power apparatus according to the present invention, the match-up points for the two portions being indicated at a, b, c, and d in each of FIGS. 4A and 4B.
Figure 4B:
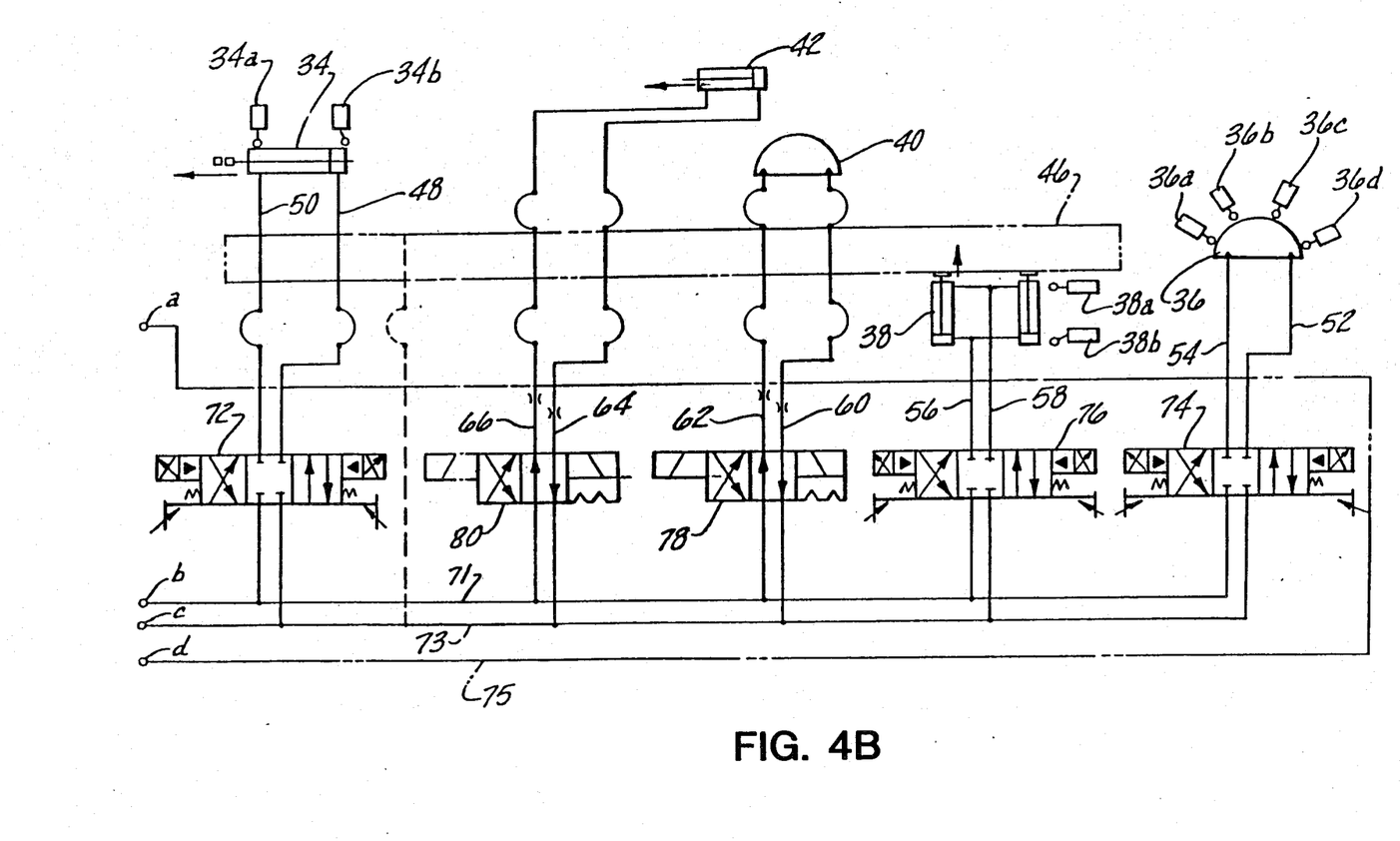

In FIG. 4B, the main linear actuator for extending and retracting the arm member 3 is indicated by reference numeral 34. The moveable element is schematically illustrated as a piston that extends and retracts with respect to a cylinder.

Position sensing devices in the form of proximity switches for sensing the extreme positions of the piston of the actuator are indicated by reference numerals 34a and 34b.

The main rotary actuator for rotating the arm assembly 2 about axis A is indicated by reference numeral 36 in FIG. 4B. Proximity switches for sensing the angular position of the shaft or other moveable element of the rotary actuator 36 are indicated at 36a, 36b, 36c and 36d.

In order to shift the arm assembly 2 along axis A between the full line position indicated by reference numeral 2 in FIG. 1 and the phantom line position indicated by reference numeral 2a, a shifting linear actuator assembly 38 (FIG. 4B) extends to lift the arm assembly to position 2a, and retracts to return the arm assembly to the full line position indicated at 2 in FIG. 1. The linear actuator assembly 38 is illustrated as including a pair of piston and cylinder assemblies, with associated proximity switches 38a and 38b for sensing the positions of the pistons.

The wrist mechanism 8 rotates about axis B in FIG. 1 between an advance and reverse position. In FIG. 4B, reference numeral 40 indicates a wrist rotary actuator for causing the wrist mechanism 8 to rotate between its extreme positions.

In FIG. 4B, reference numeral 42 indicates a gripper linear actuator for moving the gripper mechanism between its open and closed positions. The piston of the linear actuator 42 extends to move the gripper mechanism to a closed position, and retracts to open the gripper mechanism.

In FIG. 4A, reference numeral 44 indicates a rotary actuator for rotating the shaft 24 of the bell crank lever 22 of the intermediate stop mechanism 16. Proximity switches 44a and 44b are associated with the rotary actuator 44 to sense the angular position of the shaft or other moveable element of the rotary actuator about the axis of the bell crank shaft 24.

Reference numeral 46 indicates a rotary manifold which is schematically illustrated in phantom lines in FIG. 4B. Actuators 34, 40 and 42 are housed within the arm assembly 2, and therefore rotate with arm assembly 2 about axis A. The advance and reverse lines to actuators 34, 30 and 42 are thus located, in part, in the rotary manifold 46 which rotates with, or is formed as a part of the shaft or the arm assembly 2. The rotary manifold 46 is indicated as being supported by the linear actuator 38 for raising and lowering the arm assembly 2 along axis A.

The advance and reverse lines for actuator 34 are indicated by reference numerals 48 and 50, respectively, in FIG. 4B. When fluid flows into actuator 34 from the advance line 48, the moveable piston element of actuator 34 extends to the left as viewed in FIG. 4B, and fluid flows from actuator 34 through the reverse line 50. Conversely, when fluid flows into actuator 34 from the reverse line 50, the moveable piston element retracts to the right as viewed in FIG. 4B, and fluid flows from actuator 34 through the advance line 48.

The advance and reverse lines for actuator 36 are indicated by reference numerals 52 and 54, respectively. When fluid flows into actuator 36 from the advance line 52, the shaft or other moveable element of actuator 36 rotates about axis A in one direction, and fluid flows from actuator 36 through the reverse line 54. Conversely, when fluid flows into actuator 36 from the reverse line 54, the rotary moveable element of the actuator 36 moves in the opposite direction, and fluid flows from actuator 36 through the advance line 52.

The proximity switches 36a and 36b sense the positions of the shaft or other moveable element of the rotary actuator 36 in the extreme position illustrated at 2b and 2c in FIG. 2. Proximity switches 36b and 36c sense the position of the lug 10 with respect to the moveable stop elements 18 and 20 when the intermediate stop mechanism 16 is active.

The advance and reverse lines for the actuator 38 are indicated by reference numerals 56 and 58, respectively. When fluid flows into the actuator 38 from advance line 56, the moveable piston elements of the actuator 38 extend to raise the arm assembly 2 to position 2a (FIG. 1), which results in the flow of fluid from the cylinders of the actuator 38 to the reverse line 58. Conversely, flow of fluid into actuator 38 from the reverse line 58 causes the moveable piston elements to retract and lower or return the arm assembly 2 to the full line position of FIG. 1, and fluid flows from the cylinders of actuator 38 into the advance line 56.

The proximity switches 38a and 38b sense the positions of the moveable piston elements as the arm assembly 2 approaches the raised phantom line position and lowered full line position of FIG. 1, respectively.

Reference numerals 60 and 62 indicate the forward and reverse lines, respectively, for the rotary actuator 40 for the wrist mechanism 8. When fluid flows from the advance line 60 into the rotary actuator 40, the shaft or other moveable element thereof rotates in one direction causing fluid to flow from the actuator 40 through line 62. Conversely, when fluid flows into actuator 40 from the reverse line 62, the rotary moveable element thereof rotates in the opposite direction about axis B and fluid slows from the actuator 40 into line 60. The wrist mechanism 8 has only two extreme positions in the illustrated embodiment; therefore, when fluid flows to and from the actuator through lines 60 and 62, the wrist mechanism 8 moves from one extreme position to the other.

Reference numerals 64 and 66 indicate the advance and return lines, respectively, for the linear actuator 42 of the gripper mechanism. Flow of fluid into actuator 42 from the advance line 64 causes the moveable piston element thereof to extend toward the left of FIG. 4B and actuate the gripper mechanism to a closed position to grip a workpiece. This causes fluid to flow from the cylinder of actuator 42 through line 66. Conversely, flow of fluid into the cylinder of actuator 42 from the reverse line 66 causes retraction of the moveable piston element to the right in FIG. 4B forcing fluid to flow from the cylinder through the advance line 64. The gripper mechanism has two extreme positions, open and closed, and hence, actuator 42 has two extreme positions. When fluid flows to and from the actuator 42 through lines 64 and 66, the moveable piston element moves from one extreme position to the other.

Reference numerals 68 and 70 indicate the advance and reverse lines, respectively, for the rotary actuator 44 of the intermediate stop mechanism 16. Flow of fluid from the advance line 68 into the actuator 44 causes the shaft or other rotary moveable element thereof to rotate in a direction to cause the moveable stop element 20 to be extended and the stop element 18 to be retracted by rotation of the bell crank 22. This action causes fluid to flow from the actuator 44 through the reverse line 70. Conversely, the flow of fluid from line 70 into actuator 44 causes opposite rotation of the moveable element thereof which results in extension of the moveable stop member 18 and retraction of the moveable stop member 20 by reverse rotation of bell crank 22, and fluid flows from the actuator 44 through the advance line 68.

A hydraulic working fluid circuit is provided in manifold 75, and includes a main pressure line 71 and a main return line 73. Communication between actuators 34, 36 and 38 are controlled respectively by solenoid actuated proportional valves 72, 74 and 76. Communication between actuators 40, 42 and 44 and the pressure and return lines 71, 73 are controlled by conventional solenoid operated fourway valves 78, 80 and 82, respectively. An example of presently available proportional valves of the type indicated by reference numerals 72, 74 and 76 is Barmag Corporation, Part No. MEV12NWFFA23. An example of the four-way valves indicated by reference numerals 78, 80 and 82 are Ross Valve Company, Part No. 7016A3301.

Valves 72, 74, 76, 78, 80 and 82 are working fluid control valves forming a part of the control means of the apparatus.

The working fluid control valves 72, 74 and 76 are three position valves. For example, valve 72 is shown in a neutral position in FIG. 4B in which fluid is trapped in lines 48 and 50 so that the moveable piston element of actuator 34 cannot move. Movement of valve 72 to the right from the neutral position shown in FIG. 4B connects the main pressure line 71 with the advance line 48, and the reverse line 50 with the return line 73. Conversely, movement of valve 72 to the left in FIG. 4B connects the reverse line 50 with the main pressure line 71, and the advance line 48 with the return line 73.

The proportional valve 72 also operates, in cooperation with proximity switches 34a and 34b to throttle the flow through the lines 48 and 50 as the moveable piston element of actuator 34 approaches either of its extreme positions. Thus, the flow through the lines 48 and 50 is at a relatively high rate to cause rapid movement of the moveable piston element from one position to another until it approaches the second position as sensed by one of the proximity switches 34a and 34b which, in turn, signals the proportional valve 72 to reduce the rate of flow and hence the speed of movement of the moveable piston element. Similarly, the proximity switches 36a–d for actuator 36 cause the rate of movement of the actuator, and hence the arm assembly 2, to be reduced as the lug 10 approaches one of the abutments 12, 14, or intermediate stop element 18 and 20. Valve 76 Similarly cooperates with proximity switches 38a and 38b to reduce the speed of the moveable piston elements of the actuator 38 as the arm assembly 2 approaches one of the two positions shown in FIG. 1.

Figure 5:
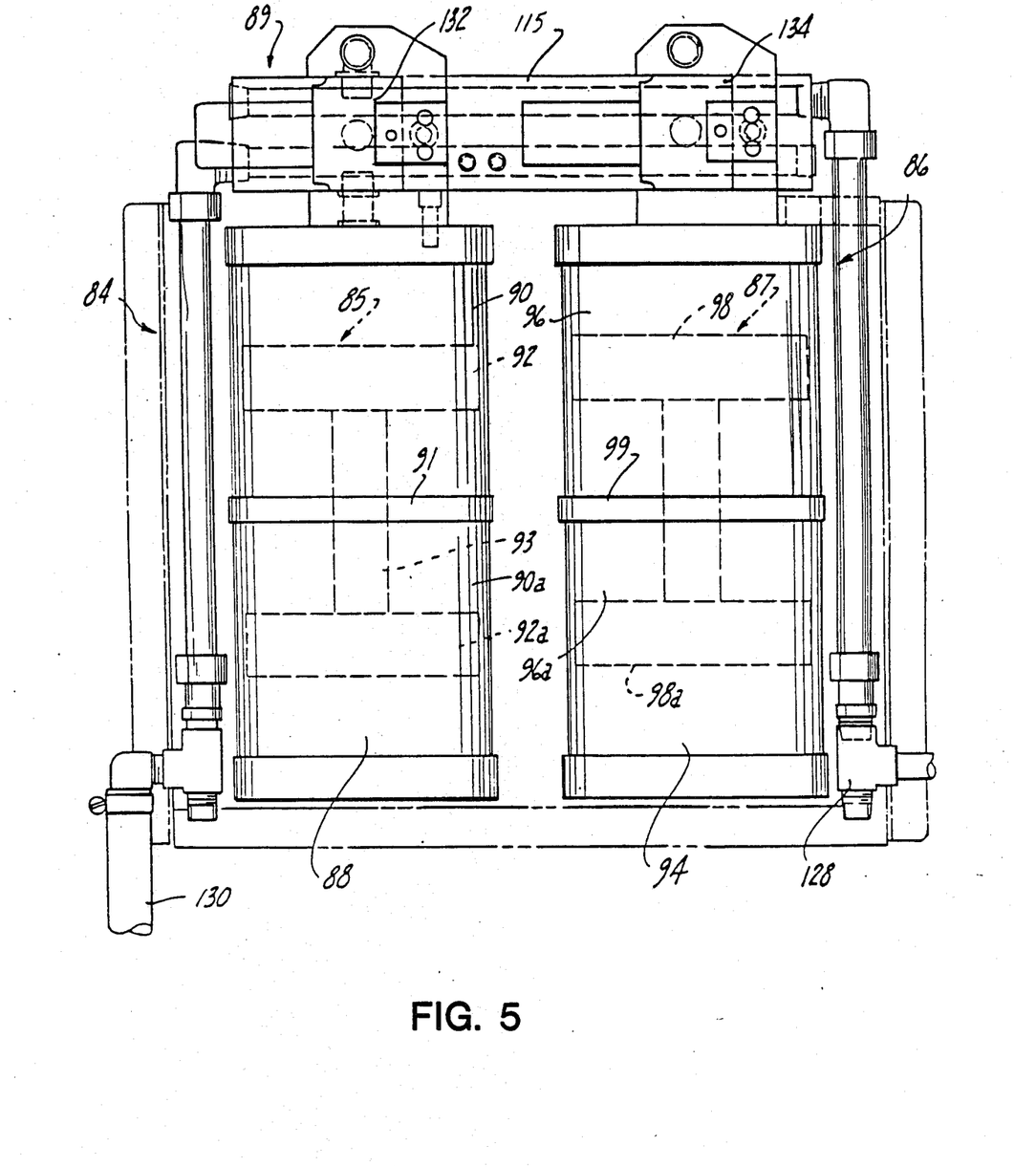
FIG. 5 is an illustrative view of the constant pressure intensification package of the present invention.

In FIG. 5 expansible chamber devices 84 and 86 are shown in detail. The expansible chamber devices include double-headed piston assemblies 85, 87 and stationary walls 91, 99 respectively. Double-headed piston assemblies 85, 87 have upper piston heads 92, 98 respectively and lower piston heads 92a, 98a respectively, which define a pair of control chambers 90, 90a in expansible chamber device 84 and pair of control chambers 96, 96a in expansible chamber device 86. Air pressure manifold 115 supplies constant air pressure to the operable pair of control chambers either 90, 90a or 96, 96a depending on which working chamber 88 or 94 is being expanded. Control valves 132 and 134 are positioned to alternately allow pressure to one pair of control chambers while exhausting the other pair of control chambers while the working chamber of the other pair of control chambers is being charged.

Figure 6:
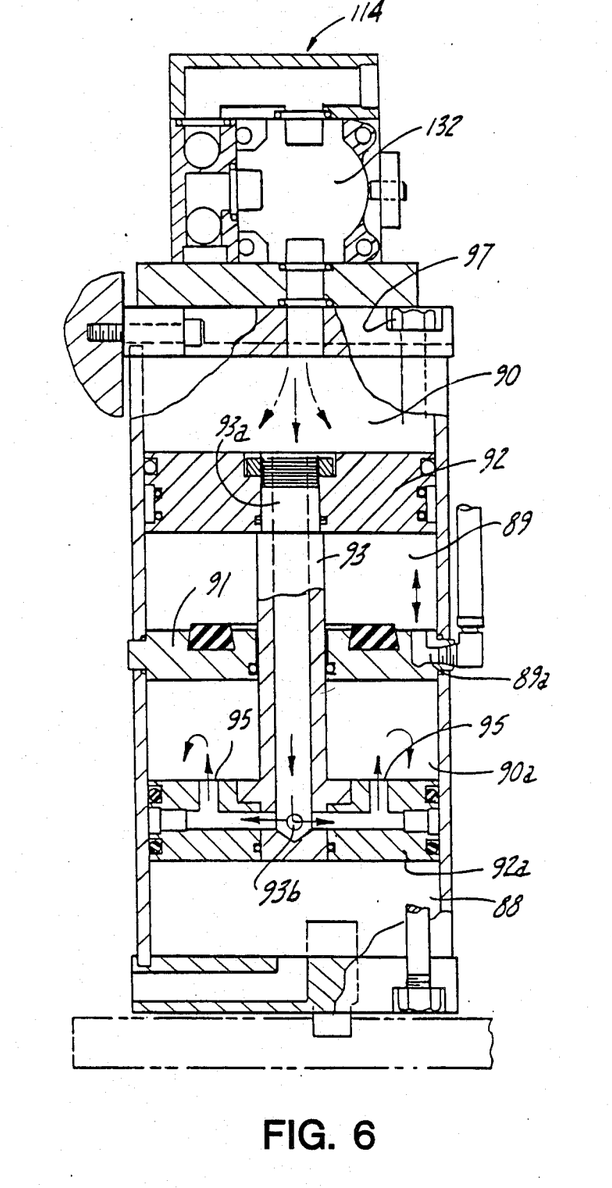
FIG. 6 is a fragmentory side view of the constant pressure intensification package

In FIG. 6 expansible chamber device 84 operates by constant air pressure of 75 p.s.i. being charged into control chamber 90 through control valve 132. Control chamber 90a is charged through hollow portion 93a, connecting ports 93b in connecting rod 93 through control fluid ports 95 in the lower piston head 92a, which provides for fluid communication between control chambers 90 and 90a, such that constant pressure is obtained in both control chambers which add to provide intensified pressure of 150 p.s.i. in working chamber 88. Pressure in control chamber 90a is trapped between stationary wall 91 and the lower piston head 92a. Chamber 89 remains substantially at atmospheric pressure throughout the cycling of the double-headed piston assembly through exhaust intake outlet 89a which is vented to the atmosphere.

In FIG. 4A reference numerals 84 and 86 collectively designate a pair of expansible chamber devices which, in the illustrated embodiment, are in the form of double-headed piston assemblies. The expansible chamber device 84 has a working chamber 88 and control chambers 90 and 90a. The upper control chamber 90 is the space between the upper piston head 92 and the top of the cylinder and the lower control chamber 90a is between the stationary wall 91 and the lower piston head 92a.

Pistons 92 and 92a are shown in their retracted positions ready to expend the working chamber 88 and correspondingly expand the control chambers 90 and 90a. Proximity switches 84a and 84b sense the retracted and extended positions, respectively, of the pistons 92 and 92a. The expansible chamber device 86 is of identical construction to the expansible chamber device 84, in the illustrated embodiment, and includes a working chamber 94 separated from control chambers 96 and 96a by pistons 98 and 98a and stationary wall 99. Piston heads 98 and 98a are illustrated in their extended position with the working chamber 94 contracted, and the control chambers 96 and 96a expanded. A proximity switch 86a senses the extended position of the pistons 98 and 98a.

The working chamber 88 is connected with the pressure and return lines 73 of the hydraulic working fluid circuit through a line 100. A check valve 104 permits flow from line 100 into the main pressure line 71, but prevents flow in the opposite direction. A check valve 106 prevents flow from line 100 into the return line 73, but permits flow in the opposite direction.

The working chamber 94 is connected with the pressure and return lines 71 and 73 by a line 102. A check valve 108 permits flow from line 101 to the main pressure line 71, but prevents flow in the opposite direction. A check valve 110 permits flow from the return line 73 into line 102, but prevents flow in the opposite direction.

Check valves 104, 106, 108 and 110 are housed within a check valve manifold 112.

Expansion and contraction of the working chambers of the expansible chamber devices 84 and 86 is caused by corresponding expansion and contraction of the respective control chambers 90, 90a, 96 and 96a. The control means fluid circuit is collectively designated by reference numeral 114 in FIG. 4A.

The control fluid circuit includes a source of air 116 or some other relatively compressible gaseous fluid under a constant pressure. When air is the controlled fluid, the pressure can be maintained by a conventional compressor.

Communication between the source 116 and a main supply line 128 is controlled by a manual valve 118. Valve 118 is a three position valve. In the position shown, the supply line 128 is disconnected from the source 116 and is connected with exhaust. As the valve 118 is moved downwardly as viewed in FIG. 4A, it sequentially moves to a position connecting line 128 with source 116, and to a position connecting source 116 with exhaust.

Reference numeral 126 designates a housing for a filter 120, a pressure regulator 122 and a pressure gauge 124 in the main supply line 128.

Reference numeral 130 indicates an exhaust line connected with atmosphere through a muffler 131. Control chambers 90, 90a and 96, 96a are connected, respectively, with lines 136 and 138. Communication between lines 136, 128 and 130 is controlled by a solenoid operated valve 132. Communication between lines 138, 128 and 130 is controlled by a solenoid operated valve 134. Valves 132 and 134 are control fluid valves. When control fluid valve 132 is moved to the right from the position illustrated in FIG. 4A, the supply line 128 is connected with line 136 to supply air or other control fluid under pressure to control chambers 90 and 90a. In the position shown, valve 134 connects the control chambers 96 and 96a with exhaust.

The apparatus is illustrated in its static condition in which the working chamber 88 is expanded so as to be filled with a charge of working fluid, while the working chamber 94 is contracted. The moveable elements of the actuator 33-44 are stationary. Control chambers 90 and 90a are connected with the supply line 128, while control chambers 96,96a are connected with exhaust. The pressure in control chambers 90 and 90a maintain a constant pressure through the piston heads 92, 92a, in lines 100 and 71 since the moveable piston and rotary elements of the actuators 34-44 are held in a stationary position. The pressure in the return line 73 is slightly above atmospheric pressure with the non-gaseous working fluid trapped between the actuators, working fluid control valves 72-82 and piston head 98a of the expansible chamber device 86.

A by-pass line 141 connects lines 100 and 102. Line 141 is controlled by a pressure relief valve 142 and an end of cycle valve 140. The end of cycle valve operates to assure that the hydraulic working fluid builds up to a full charge in the working chamber 88 at the completion of a cycle as described in greater detail below.

Pressure switches 144 and 146 communicate with lines 100 and 102, respectively. The pressure switches are set at a predetermined pressure, for example, 40 p.s.i., and cooperate with other elements of the control means to control a cycle of operation as described in greater detail below.

Reference numeral 148 designates a pre-fill fitting utilized to initially charge the hydraulic working fluid circuit.

The operation of the apparatus will be described with reference to a specific design and under specific pressure conditions. However, the specific sizes and pressure levels are given by way of example only, and are not to be interpreted as limitations on the scope of the invention.

In a specific design of the apparatus, the piston heads 92, 92a, 98 and 98a are eight inches in diameter, and the piston connecting rods 93 are four inches in diameter. Air at a constant pressure of 75 p.s.i. is supplied from the source 116 to the supply line 128.

The pressure switches 144 and 146 are set at 40 p.s.i.

In the static condition of the apparatus, the proportional valves 72, 74 and 76 are in their neutral positions. The moveable elements of actuator 40, 42 and 44 are in one of their respective extreme positions engaged with a stop or abutment so that fluid can flow into and out of the respective valves 78, 80 and 82. Control chambers 90 and 90a are pressurized by the supply line 128, while control chambers 96 and 96a are connected to exhaust. The 75 p.s.i. pressure in control chambers 90 and 90a produces a 150-175 p.s.i. pressure in lines 100 and 71.

A cycle starts when there is a demand for flow of working fluid to one of the actuators as determined by movement of one of the six working fluid control valves 72-82. Assuming moving the valve 72 to the right to connect the pressure line 71 with the advance line 48 and the reverse line 50 with the return line 73, the resulting movement of the moveable piston element of the actuator 34 causes pistons 92 and 92a of the expansible chamber device 84 to contract working chamber 88 to expel the fluid therein to line 100 past check valve 104 into the pressure line 71, and from the return line 73 past check valve 110 into the working chamber 94. When piston heads 92 and 92a reach the proximity switch 84b, the control valve 134 is actuated to connect control chambers 96 and 96a with the supply pressure from line 128. When the pressure in line 102 reaches 40 p.s.i. as sensed by the pressure switch 146, the air control valve 132 is actuated to exhaust control chambers 90 and 90a. When pistons 98 and 98a return to the extended position adjacent proximity switch 86a, the control valve 132 is again actuated to pressurize control chambers 90 and 90a. When the pressure reaches 40 p.s.i. in line 100 as determined by pressure switch 144, control valve 134 shifts to exhaust chamber 96.

The sequence is repeated until the end of the power actuation cycle. At this time, the end of cycle valve 140 moves to an open position to permit flow through line 141 into line 100 and chamber 88 to assure that chamber 88 receives a full charge of working fluid as pistons 92 and 92a return to their fully retracted position illustrated in FIG. 4A. At this time, there can be a momentary drop in the pressure from 50-125 p.s.i. to approximately 100 p.s.i. during the time that the pressure is balancing between the two working chambers 88 and 94. As the cycle is completed and chamber 88 is being filled with working fluid with all of the actuators in a static condition, the end of cycle valve 140 functions to make sure that fluid flows from line 102 into the working chamber 88 as necessary to restore chamber 88 to its fully expanded and fully charged condition. During this momentary condition, the pressure in the working fluid circuit can drop to approximately 100 p.s.i. which is set by the relief valve 142. At the completion of the cycle, the static condition is restored with chambers 90 and 90a pressurized and chambers 96 and 96a connected to exhaust.

The apparatus remains in the static condition until there is a demand for flow caused by movement of one of the actuators 34-44. When there is a demand, for example, for movement of the moveable piston element of the actuator 34 from the position illustrated in FIG. 4B, the working fluid control valve 72 moves to the right to connect the advance line 48 with the main pressure line 71 and the reverse line 50 with the return line 73. As a result, the moveable piston element of actuator 34 begins to extend and the control chambers 90 and 90a of the expansible chamber device 84 begin to expand to correspondingly contract the working chamber 88 and expel the fluid therefrom into line 100 past valve 104 into the pressure line 71. As the fluid flows from the main pressure line 71 through line 48 into actuator 34, fluid flows from actuator 34 into line 50. The fluid from line 50 flows through line 73 past check valve 110 into line 102 to cause the working chamber 94 to expand as the working chamber 88 contracts.

When the piston heads 92 and 92a reach the extended position, proximity switch 84b senses the position of the piston and the control valve 134 is actuated to connect control chambers 96 and 96a with the supply line 128, and to connect line 136, and hence control chambers 90 and 90a, with exhaust. This occurs when pistons 98 and 98a have reached the retracted position in which the working chamber 94 is expanded to receive a charge of working fluid. Control chambers 96 and 96a then begin to expand because of the pressure from the supply line 128 causing the charge of working fluid in the working chamber 94 to be expelled into line 102 past check valve 108 into the pressure line 71. The return flow from line 73 flows past check valve 106 into line 100 and the working chamber 88 to cause corresponding expansion of working chamber 88 and contraction of the control chambers 90 and 90a. When piston heads 98, 98a return to their extended position indicated in FIG. 4A, the position of piston head 92a is sensed by the proximity switch 86a, and the retracted position of piston heads 92 and 92a is sensed by the proximity switch 84a. This results in actuation of the control fluid valves 132 and 134 to respectively connect control chambers 96 and 96a with exhaust and control chambers 90 and 90a with supply line 128 to repeat the sequence. The sequence is repeated until the moveable piston element of actuator 34 reaches its extended position. When this occurs, the apparatus returns to its static condition with control chambers 90 and 90a connected with the supply line 128 and control chambers 96 and 96a connected with exhaust with the pistons 92, 92a and 98, 98a in their retracted and extended positions, respectively.

In the static condition of the apparatus:

(1) Pistons 98 and 98a of the expansible chamber device 86 are extended;

(2) Pistons 92 and 92a of the expansible chamber device 84 are retracted;

(3) Control chambers 90 and 90a are pressurized by the air or other control fluid from line 136;

(4) Line 138 is connected to exhaust the control chambers 96 and 96a;

(5) The control pressure on pistons 92 and 92a maintains a constant pressure in the main pressure line 71;

(6) Even though control chambers 90 and 90a are pressurized, pistons 92 and 92a cannot extend because the hydraulic working fluid is trapped unless and until one of the working fluid control valves shifts to a position to cause fluid to flow into its respective actuator in a direction to cause movement of the piston or rotary element which creates a demand for flow of hydraulic fluid through the circuit including lines 71 and 73;

(7) The hydraulic working fluid in the return line 73 is trapped between the various actuators 34–44, or their corresponding working fluid control valves 72–82 and piston 98; no pressure is directly applied to the non-gaseous working fluid in the return line 73, although it is not directly exposed to atmosphere.

Fluid cannot flow from the return line 71 past check valve 110 except by overcoming any resistance to flow around check valve 110. Check valve 110 is held in its closed position by a light spring.

The pressure in line 71 will always be the same as the pressure in lines 100 and 102 except for the pressure drop across check valves 104 and 108. In the static condition, with an air pressure of approximately 75 p.s.i. on pistons 92 and 92a, a constant pressure of approximately 150 p.s.i. is produced in line 100, and hence line 71. Since the only pressure in the return line 73 is provided by the back pressure from the actuators 34–44, the pressure in line 73 is normally lower than the pressure in line 102 because fluid can flow from the return line into line 102 only by overcoming check valve 110. Similarly, flow from the return line 71 into line 100 can only take place by overcoming check valve 106.

While the apparatus is illustrated as having a plurality of actuators 34–44, the invention obviously encompasses an apparatus in which there is only a single actuator. For example, the apparatus is applicable to the operation of only a single actuator, such as actuator 13. Thus, the invention is for fluid power apparatus comprising a pair of expansible chamber devices 84, 86 each having double-headed piston assemblies 85, 87 and a working chamber 88, 94, that expands to receive a charge of working fluid and contracts to expel working fluid therefrom. The double-headed piston assemblies define control chambers 90, 90a and 96, 96a respectively, which intensify the output pressure of the working chamber fluid; a working fluid circuit including a first line 100 connected with one of the working fluid chambers 88 and a second line 102 connected with the other of the working chambers 94; a fluid actuator 34 connected with said circuit and having a moveable element that moves in response to flow of working fluid in the circuit to the actuator; said apparatus having a static condition in which working chamber 94 is contracted with the moveable element of the actuator 34 stationary in a first position; and control means 72, 114, 34a, 34b, 84a, 84b, 86a operable in response to a demand to change the position of the moveable piston element of the actuator 34 from the first position shown in FIG. 4B to a second position to sequentially and alternately contract and expand the working chambers 88 and 94, respectively, to cause flow of working fluid to the actuator 34 and move the piston element to the second position and thereafter restore the static condition of the apparatus.

While a specific embodiment of the invention has been illustrated in the drawings and described in the accompanying specification, it will be apparent to those skilled in the art that the invention is not limited to the exact construction shown. To the contrary, various alternatives in the construction and arrangement of parts, all falling within the scope and spirit of the invention, will be apparent to those skilled in the art.

What is claimed is:

1. Fluid power apparatus comprising:

a pair of expansible chamber devices (84,86) each having a working chamber (88,94) that expands to receive a charge of working fluid and contracts to expel working fluid therefrom and a control chamber for pressurizing said working chamber to expel working fluid therefrom; a moveable wall for separating said control chamber from said working chamber; a closed working fluid circuit including a first line (102) connected with one of said working chambers (86) and a second line (100) connected with the other of said working chambers (84); a fluid actuator (44) connected with said circuit and having a moveable element that moves in response to flow of working fluid in said circuit to said actuator, said apparatus having a static condition in which said one working chamber (88) is contracted, said other working chamber (94) is expanded and with the moveable element (44) of said actuator being stationary in a first position, control means (114) operable in response to a demand to change the position of said moveable element (44) from said first position to a second position to sequentially and alternately contract and expand said one (88) and said other (94) working chambers, respectively, to cause flow of working fluid to said actuator and move said moveable element (44) to said second position and thereafter restore said static condition, a source of control fluid under pressure (116), said control means (114) being operable to control communication between the control pressure source (116) and said one and said other control chambers, said control means (114) further including control fluid valve means (132,134) for controlling supply and exhaust of control fluid from said control chamber, said control fluid valve means (132,134) including end of cycle sensing means (84b) for sensing when said when said moveable wall is near the end of its cycle and operating said control fluid valve means (132,134) to couple the expanded working chamber to said source of control fluid before changing the valving to couple the expanded control chamber to exhaust, and for keeping constant pressure in said working fluid circuit, said working fluid circuit including pressure sensing means (144,146) for sensing a low pressure in either one of said first (102) or second (100) lines having the contracted working chamber and for changing said control fluid valve means (132,134) to exhaust said expanded control chamber and allowing the recharging of said contracted working chamber, said working fluid circuit including a main pressure line (71) and a main return line (73), and further including check valve means (110,108,106,104) permitting flow from said return line (73) into said first (102) and second line (100), but preventing flow from said first (100) and second (102) lines, into said return line (73) and said pressure line (71) into said first (102) and second (100) lines, and said one control chamber (96,96a) being connected with said source of control fluid (116) and said other control chamber (90,90a) being connected with exhaust (131) by said control fluid valve means in said static condition.

2. The apparatus as set forth in claim 1 wherein the operable surface area of said moveable wall in said control chamber is greater than the operable surface area of said moveable wall exposed in said working chamber for intensification of pressure in the working chamber.

3. The apparatus as set forth in claim 2 wherein said moveable wall includes a double-headed piston assembly (85), said double-headed piston assembly (85) including an upper piston head (92), a lower piston head (92a), and a connecting rod (93) for rigidly connecting said upper piston head (92) with said lower piston head (92a) for simultaneous movement of said upper piston head (92) and said lower piston head (92a), a stationary wall (91) positioned between said upper piston head (92) and said lower piston head (92a), said connecting rod (93) passing through said stationary wall (91) and sealed in sliding engagement with said stationary wall, said double-headed piston assembly (85) also defining a pair of control chambers (90,90a), said pair of control chambers (90,90a) including an upper control chamber (90) and a lower control chamber (90a), said upper control chamber (90) being defined as the space between the top surface of the upper piston head (92) and the top of the expansible chamber device (84), said lower control chamber (90a) being defined as the space between the top surface of the lower piston head (92a) and the bottom surface of said stationary wall (91), said connecting rod (93) having an upper end, a lower end and a hollow portion (93a), said lower piston (92a) head having control fluid ports (95), said lower end of said connecting rod having connection ports (93b) for connecting said hollow portion (93a) with said control fluid ports (95) in said lower piston head for charging the lower control chamber, (90a), said upper control chamber (90) being in fluid communication with said lower control chamber (90a) through said hollow portion (93a) connection ports (93a) and said control fluid ports (95) in said double-headed piston assembly (85).

4. The apparatus as set forth in claim 2 wherein said moveable wall includes a single-headed piston portion and a piston shaft portion extending through said working chamber for reducing the operable surface area of said single-headed piston portion exposed in said working chamber and intensifying the fluid pressure in said working chamber.

5. Apparatus as claimed in claim 2 further including advance and reverse lines (68,70) connected with said actuator (44) such that flow of working fluid into said actuator (44) from said advance line (70) causes said moveable element (44) to move in one direction as well as flow of working fluid from said actuator through said reverse line (68) causing said moveable element (44) to move in the other direction.

6. Apparatus as claimed in claim 5 wherein said control means (114) includes a working fluid valve (82) having a first position in which said advance line (70) is connected with said pressure line (71) and said reverse line (68) is connected with said return line (73), and a second position in which said advance line (70) is connected with said return line (73) and said reverse line (68) is connected with said pressure line (71).

7. Apparatus as claimed in claim 6 in which the moveable element of said actuator (44) is moveable between first and second extreme positions, and is moveable from said first to second position in response to flow of working fluid from said reverse line (68) into said actuator (44) when said working fluid valve (82) is in its second position, and is moveable from said second to first position when said working fluid valve (82) is in its first position.

8. Apparatus as claimed in claim 7 in which said working fluid valve (82) is a proportional valve operable to vary the rate of flow through said advance and reverse lines.

9. Apparatus as claimed in claim 8 further including sensing means (44a, 44b) for sensing the position of said moveable element as it approaches said forward and rearward positions, said working fluid valve (82) being responsive to said sensing means (44a, 44b) to reduce the rate of flow through said advance and reverse lines (68,70) as said moveable element approaches one of said extreme positions.

10. Apparatus as claimed in claim 9 wherein said working fluid valve (82) has a third, neutral position in which said advance and reverse lines (68, 70) are blocked and working fluid is trapped therein, said working fluid valve (82) being in said neutral position in said static condition.

11. Apparatus as claimed in claim 10 wherein said control fluid valve means (132, 134) has first position in which said one pair of control chambers is connected with said control fluid source and said other pair of control chambers is connected with exhaust.

* * * * *